(12) United States Patent
Haes

(10) Patent No.: US 7,735,659 B2
(45) Date of Patent: Jun. 15, 2010

(54) FILTER ELEMENT MOUNTING APPARATUS

(75) Inventor: Robert Haes, Salzgitter (DE)

(73) Assignee: Madison Filter 981 Ltd., Haslingden, Lancashire (GB)

( * ) Notice: Subject to any disclaimer, the term of this patent is extended or adjusted under 35 U.S.C. 154(b) by 0 days.

(21) Appl. No.: 10/595,863

(22) PCT Filed: Nov. 5, 2004

(86) PCT No.: PCT/GB2004/004675
§ 371 (c)(1),
(2), (4) Date: Mar. 8, 2007

(87) PCT Pub. No.: WO2005/051518
PCT Pub. Date: Jun. 9, 2005

(65) Prior Publication Data
US 2007/0251872 A1 Nov. 1, 2007

(30) Foreign Application Priority Data
Nov. 18, 2003 (GB) ................. 0326790.3

(51) Int. Cl.
B01D 27/06 (2006.01)
B01D 27/08 (2006.01)
B01D 35/30 (2006.01)
B01D 35/00 (2006.01)

(52) U.S. Cl. ............... 210/493.1; 210/445; 210/451; 55/495; 55/511; 55/DIG. 31

(58) Field of Classification Search ............ None
See application file for complete search history.

(56) References Cited

U.S. PATENT DOCUMENTS

| 2,792,906 | A | * | 5/1957 | Evans ................ 55/502 |
| 3,168,917 | A | * | 2/1965 | Bartels .............. 29/432 |
| 5,472,379 | A | * | 12/1995 | Andress et al. ........ 454/158 |
| 5,609,937 | A | * | 3/1997 | Reinstad ............. 428/122 |
| 5,849,187 | A | * | 12/1998 | Plaisier ............. 210/445 |
| 6,319,300 | B1 | * | 11/2001 | Chen ................ 55/497 |
| 6,568,540 | B1 | * | 5/2003 | Holzmann et al. ...... 210/445 |
| 6,626,970 | B2 | * | 9/2003 | Pipkorn et al. ....... 210/232 |

FOREIGN PATENT DOCUMENTS

| DE | 3304350 A1 | 8/1984 |
| EP | 0542396 A2 | 5/1993 |
| GB | 2294649 A | 5/1996 |

* cited by examiner

Primary Examiner—Krishnan S Menon
Assistant Examiner—Madeline Gonzalez
(74) Attorney, Agent, or Firm—Barlow, Josephs & Holmes, Ltd.

(57) ABSTRACT

A filter element, consisting of two pleated filter cloths has side frame members or strips and top and bottom frame members. The top and bottom edges of the cloths are encapsulated in the frame members, and the side edges of the filter cloths are clamped by the side frame members. This may be done by molding the frame members onto the cloth side edges, or by providing a slot in a tubular side frame member within which the side edges are held against the inner face of the slotted wall of the tube by a clamping member, such as a U-shaped strip, or by an indented part of the opposed wall.

19 Claims, 3 Drawing Sheets

FILTER ELEMENT MOUNTING APPARATUS

This invention relates to an improved filter element mounting apparatus which may of particular application to pleated filter elements.

Pleated filter elements typically comprise a pair of self-supporting filter cloths each folded into a zig-zag configuration and mounted in a frame adjacent each other, usually with the inward and outward folds of the two cloths aligned so that a top view shows a series of diamond or fusil shaped chambers defined between the filter cloths. EP-A-0,351,850 (RAPP) shows a filter assembly featuring pleated filter cloths, the upper and lower edges of which are mounted in plastics end bodies, and the inward folds of which are overlapped to provide overlap zones for securing the filter cloths together using adhesive. In WO 03/015893 (MADISON) we disclose a pleated filter element wherein the edges of the filter cloths are sealed by a sealant and held in channel sectioned strips.

In so far as these are secured primarily by the use of adhesive, a number of problems arise as the adhesive can fail during continuous use at temperatures above for example 90° C., fabrication can be time consuming and awkward as the ends have to be held together precisely in accurate alignment and without any displacement, while the adhesive is applied and cured or dried. If the ends are not lined up correctly, or allowed to slip during curing, then the seam will leak. The use of partially overlapping pleats secured by adhesive also reduces the filter surface available to pass filter medium due to the overlap and also due to the closure of pores in the filter medium in the adhesive coated area. This reduction in surface area materially affects the flow rate of the filter as a whole.

In order to overcome some of the problems arising in pleated filters, including the exposure of fold lines to abrasion from particle streams, and the fragility of the filter medium, attempts at reinforcement and protection have been made, including use in the said WO 03/015893 of a mesh or perforated sheet support for a nonwoven fibrous batt filter material to which the batt is attached by hydroentanglement causing fibres of the batt to penetrate the mesh and thus anchor the batt to the mesh. Other expedients include the use of angle-sectioned strips covering outward pleat folds, or within inward pleat folds, or circular or U-shaped members, and the provision of channel section cover strips to protect and clamp the adhered edges of the filter elements. The mesh or perforated sheet support for the filter medium, and the other protective strips and top and bottom supports can in some cases be of rigid plastics, but are usually of metal such as steel. On scrapping of used filter elements however, incineration leaves a substantial amount of scrap metal for disposal. The use of metal components also increases the weight of each filter element making filters with large surface areas heavy and difficult to handle. Some of the reinforcing elements such as pleat fold covering strips, result in a loss of effective filtration area, as they cover substantial areas of the filter medium surface.

Metal reinforcements are also used in many current compact filter elements which cover the ends of the pleated filter medium, which comprise profiled strips with a channel shaped part which receives the ends of the filter elements and grips them in a compression spring grip, with extended side wings which extend out to each side to cover the full width of the last pleat of the filter and thereby protect the end of the filter element from abrasion from air or other fluid medium entrained particles. In many filter elements these metal reinforcements are not however sufficient to give the filter rigidity and can be easily deformed prior to or during installation, or during use. Any deformation of the metal sides means that the filter elements become misshapen and makes them difficult to install or remove from the slot in the filter housing through which the element is inserted.

It is an object of the present invention to improve on existing compact filter elements by avoiding the use of metal components or adhesive, to avoid the failure incidence of adhesive, and the presence of scrap metal after incineration of life expired filter elements.

In accordance with the present invention, a filter construction comprises a filter element comprising two pleated filter cloths mounted so that their folds are oppositely directed to form a series of lozenge-sectioned filtration chambers, characterised in that the end edges of the filter cloths are clamped in an edge strip at each end.

Preferably the pleated filter cloths are also secured at top and bottom, to top and bottom frame members. The top and bottom edges of the pleated filter cloths are advantageously encapsulated into moulded top and bottom frame members.

The edge strips are preferably wider than the pleats in the filter cloths and may be formed as mouldings which provide rigid side elements and the side elements are preferably reinforced by reinforcing members, such as rods or profiles, made from glass, carbon or synthetic fibre reinforced plastics. Alternatively, the reinforcing members may comprise fibres, braid or other textiles of glass, carbon or synthetic material.

In alternative embodiments, the edge strips may each comprise a generally tubular member having a longitudinal slot in one wall thereof into which the end edges of the filter cloths are inserted and retained by a clamping member.

The clamping member may comprise a u-sectioned strip which has one or more surfaces which press the end edges of the filter cloths against the inner face of the slotted wall, and opposed surfaces which bear on the opposed wall of the strip.

The clamping member may alternatively be provided by an indented part of the opposed side wall which is disposed to press the edge regions of the filter cloths against the inner surface of the slotted wall of the strip.

The edge strip may be one of a range of tubular sections, for example generally elliptical, generally rectangular, with any degree of elongation including square, or trapezoidal with a curved slotted wall which provides flanges at each side of the strip, or a waisted oval with opposed faces indented to define a two lobed cross-sectional strip, and as noted above press the filter cloth edge regions against the inner surface of the slotted wall.

The edge strips may be of polyurethane resin, comprising a two-part thermo-setting preparation which sets within 20 minutes of mixing and may have a hardness of about 90 Shore A.

The edge strips may be formed to be complementary so that a plurality of elements can be connected side-to-side, for example one edge strip may be formed with two ribs which leave a channel there between and a complementary edge strip may be formed with a single rib which is dimensioned and shaped so as to fit into the channel, so that the strips can be nested together when laid back to back.

Similar interconnectable parts may be provided on the top and bottom frame members so that a filter panel both higher and wider than the individual filter elements can be built up.

An embodiment of filter element in accordance with the invention will now be described by way of example, with reference to the accompanying drawings, wherein:—

Figure 1:
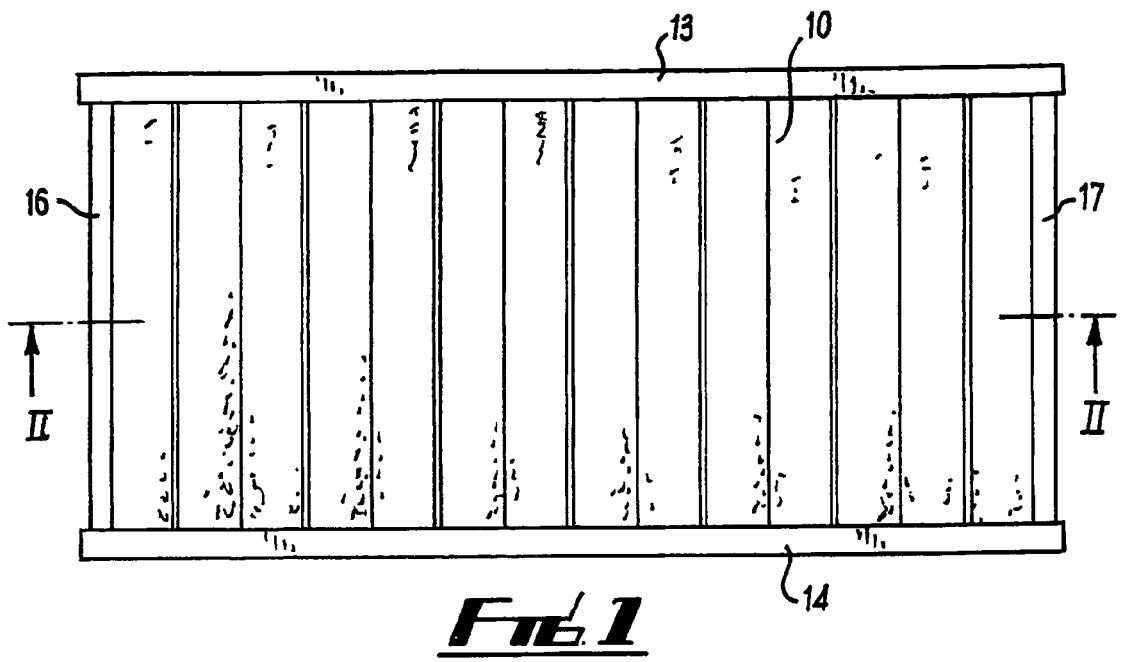
FIG. 1 is an elevational view of the filter element.

As shown in the drawings, a compact filter element embodying the invention consists of two pleated filter cloths 10, 11 extending alongside each other with the pleats arranged so that both inward and outward folds coincide, so that the cloths 10, 11 enclose between them a series of volumes which each in cross-section resembles a series of lozenge or diamond shaped cavities 12.

The top and bottom edges of the cloths 10, 11 are received in top and bottom frame members 13, 14, the edges preferably being introduced into the moulds for the frame members before introduction of the resin from which they are moulded, or whilst the resin is still unset, so that the edges of the cloths are moulded integrally with or "potted" in the resin.

Figure 2:
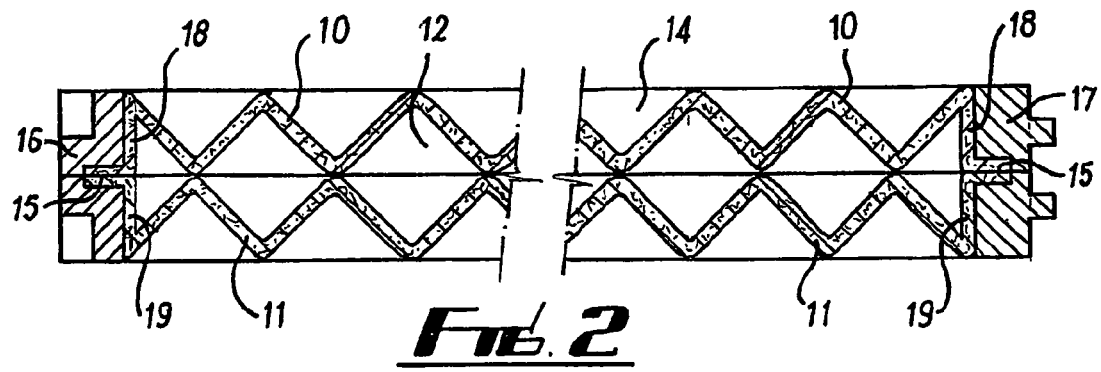
FIG. 2 is a sectional view of the filter element on line II-II of FIG. 1.
Figure 3:
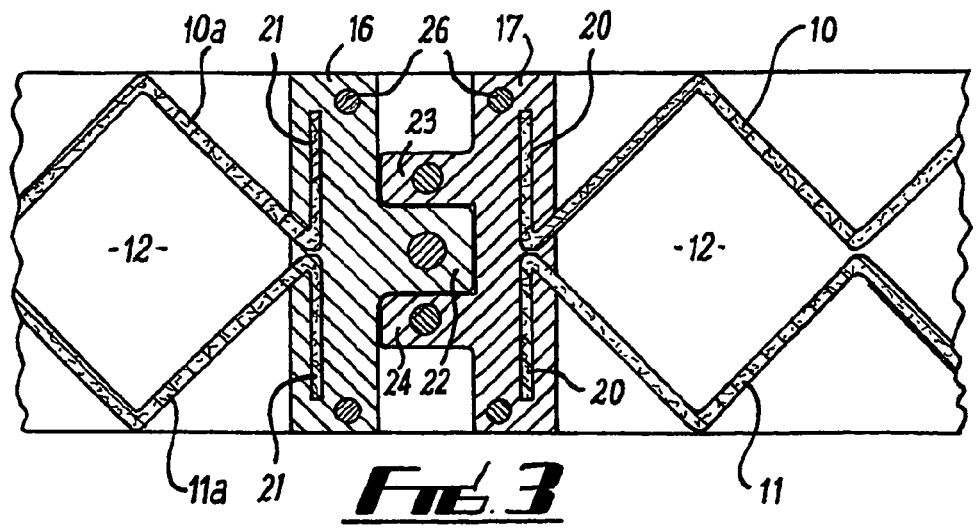
FIG. 3 is an enlarged sectional view of the sides of two adjacent filter elements showing how the filter cloths are secured at their sides, and interlocking of side retaining members.

The side ends of the cloths 10, 11 are secured by bringing the edges of the two cloths together, as at 15, in FIG. 2 and moulding the joined edges into a vertical side member 16 or 17, either pinched together as in FIG. 2, or laid flat after the pinch point in the mould, as a partial last pleat in FIG. 3. The frame members are wider than the width of the pleats formed in the filter cloths 10, 11.

FIG. 2 shows partial last pleats 18, 19 bonded by moulding into the surface of the respective side members 16, 17, whilst partial pleats 20, 21 are deeply embodied in the resin in FIG. 3.

The vertical side members 16, 17 are made of complementary cross-section to enable abutting side members to interlock as in FIG. 3. Side members 16 are formed with a single rib 22, whilst side members 17 are formed with spaced ribs 23, 24 with a groove 25 between which is capable of receiving the rib 22 on the side member 16 in a close press or force fit.

The side members 16, 17 contain embedded therein longitudinal reinforcing elements such as rods 26 of suitable plastics material. Suitable materials include high density polyolefines, polyamides or acryl materials. Alternative reinforcements may be in the form of bundles of fibres or yarns, nonwoven fabrics or meshes of any suitable synthetic material. Similar reinforcements may be provided in the top and bottom members 13, 14.

FIG. 3 shows how preferably the ends of the filter cloths 10, 11 are embedded in and anchored in the side members 16, 17, with at least an inward fold of an end pleat of each fabric encapsulated in the moulded resin side members. This provides for firm anchorage and effective sealing of the filter cloths, and the complementary ribs and grooves of the side members ensure interconnectability of the filter elements to provide larger filter panels. To this end, the top and bottom members 13, 14 may also be made to be interconnectable.

The use of all-combustible material in the cloths, top bottom and side members and the avoidance of metal reinforcements in the top and bottom members and side members, or in association with the filter cloths means that spent filter elements can be disposed of by incineration without leaving metal scrap for disposal otherwise.

The side members 16, 17 also are wide enough to prevent abrasion of the filter elements by particles entrained by air or other fluids incident from the sides.

Figure 4:
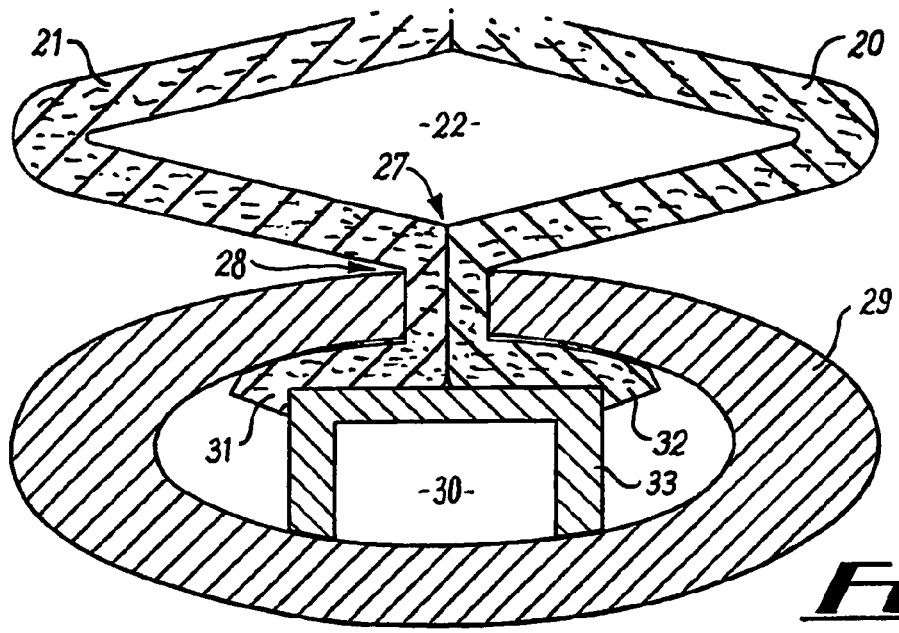
FIG. 4 is a sectional view of a further embodiment of side retaining member for a pleated filter element.
Figure 5:
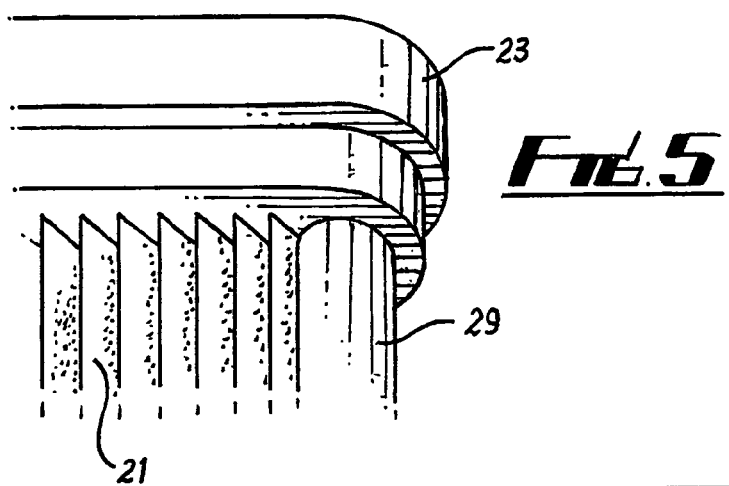
FIG. 5 is a fragmentary perspective view of a corner of the further embodiment showing an end of a top or bottom retaining frame member.
Figure 6:
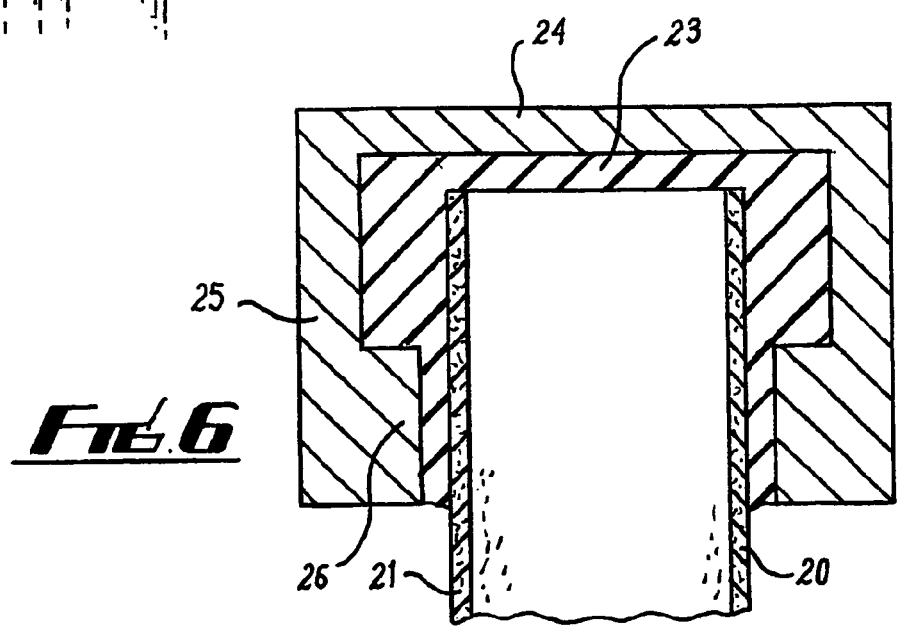
FIG. 6 is a sectional view of the top or bottom retaining frame member of FIG. 5.

FIGS. 4, 5 and 6 illustrate a further embodiment of filter apparatus. The apparatus comprises a pleated filter element consisting of two pleated filter cloths 20, 21 which as described in relation to FIGS. 1 to 3 are arranged so that both inward and outward folds coincide so that the cloths 20, 21 enclose between them a series of volumes which each in cross-section resemble lozenge or fusil or diamond shaped cavities 22.

The ends of the filter cloths 20 and 21 are bought together at 27 and pushed through a slot 28 in a vertical side member 29, and splayed out again within a hollow space 30 inside the member 29 forming respective end parts 31, 32. These are pressed against the inner face of the side member 29 to each side of the slot 28 by means of a channel-sectioned strip 33 inserted into the space 30.

The side member 29 is generally C-shaped in cross-section, and the arrangement provides for positive clamping of the ends of the filter cloths due to the strip 33, in the side member.

The top and bottom edges of the cloths 20 and 21 with edge strips 29 are received in top and bottom frame members which are wider than the pleats formed in the cloths, and a perspective view of an end part of a top frame member 23 is shown in the fragmentary view of FIG. 5, and in cross-section in FIG. 6. The top and bottom edges of the cloths 20, 21 are received in the top frame member 23, and correspondingly in the non-illustrated bottom frame member, and are moulded into the frame members. FIG. 6 illustrates the moulding of the filter cloths into the frame members such as 23 as these are produced.

The spaces 22 between the cloths may be closed off by resin in the bottom frame member 23, as shown, but at the top are left open to allow the escape of gas from the spaces 22, simply by bringing the edges of the cloths into abutment with the mould 24.

The cloths 20, 21 are inserted into a cavity of a mould 24, having side walls 25 formed with inwardly stepped rims 26. The cavity is then filled with resin or a mouldable plastics material which is cured or set to encapsulate or 'pot' the edges of the filter cloths 20, 21 within the cavity, and the mould is then stripped off (it may be of flexible material, or be in two parts, to aid removal) leaving a moulded body forming the frame member 23, providing a stepped configuration as shown in FIG. 5.

FIGS. 7 to 10 show further embodiments of vertical side member, of differing cross-sections all of a fundamentally C-sectioned profile, or a hollow box strip with a longitudinal slot, and which are all wider than the pleats of the filter cloths.

Figure 7:
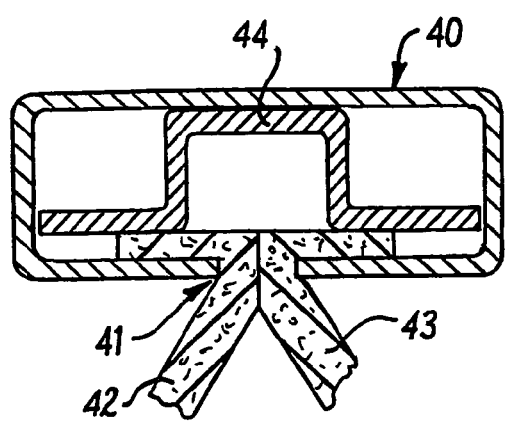
FIGS. 7 to 10 are sectional views of further embodiments of side retaining member for the ends of a pleated filter element. for a pleated filter element.

In FIG. 7, a side member 40 comprises a simple box sectioned hollow strip, with a slot 41 extending along the centre line of one wall of the member, the member being of a relatively elongate rectangular cross-section, with a slot 41 formed in one of the wider walls. The edges of the filter cloths 42, 43 are received in the member 40 in the same way as in the FIG. 4 embodiment, that is the edge extremities of the cloths are folded back into contact with the inner face of the slotted wall, and retained by a u-sectioned strip 44, which has ends which press on the edge extremities of the filter cloths.

Figure 8:
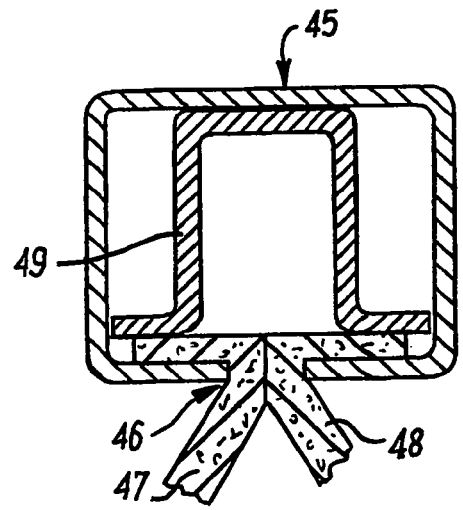

FIG. 8 shows a further embodiment, of a similar side member 45, with a slot 46, receiving the edges of filter cloths 47, 48 which are retained within the member 45 by a u-sectioned strip 49.

This differs from the FIG. 7 embodiment in that the shape of the box section is closer to equilateral, and may in a variant be square.

Figure 9:
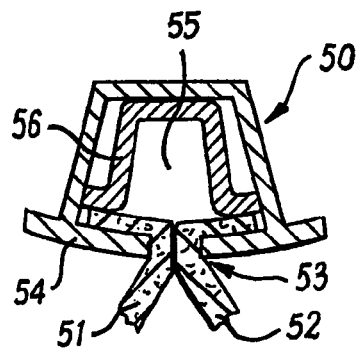

FIG. 9 shows a further embodiment of side member 50, which receives the ends of filter cloths 51, 52 through a slot 53 in a curved wall 54, which is connected to but extends beyond, side walls defining with a rear wall a trapezoidal cavity 55 in which a u-sectioned member 56 presses the edges of the filter cloths against the inner face of wall 54.

Figure 10:
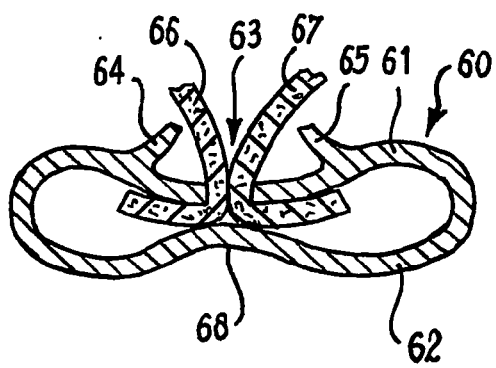

Finally FIG. 10 shows an edge strip 60, in cross-section which has a more complex form, being in the form of a modified oval, provided with a waist by indenting opposed side walls 61 and 62 so that the strip 60 encloses a double-lobed cavity comprising wider parts at each edge of the strip 60, joined by a constricted zone along the centre line of the strip between the indented side walls 61 and 62.

One of the side walls 61 is provided with a central longitudinally extending slot 63, and with longitudinal guide ribs or flanges 64, 65.

The edge regions of a pair of pleated filter cloths 66, 67 are inserted through the slot 63, and turned over divergently as shown to be against the inner face of side wall 61.

The indented part 68 of the other sidewall 62 presses upon the turned over ends of the cloths 66, 67 as shown to grip the cloths and retain them, in place of the u-sectioned inserts provided in FIG. 4 and FIGS. 7, 8 and 9. In a modified embodiment and procedure, the cavities within the side edge strips 29, 40, 45, 50 and 60 are, after positioning of the respective ends of the filter cloths, and the clamping strips where separately provided, filled with a thermosetting resin which is poured into the cavities, thereby encapsulating the filter cloth ends and the clamping strips so that they are secured in place and cannot be pulled free of the edge strip. An alternative is to fill the cavity with an expanding polymeric foam which would also maintain the low weight of the completed filter element.

In manufacture, the side edge strips such as 29 etc are fixed first to the ends of the filter cloths, then the top and bottom mouldings such as 13, 14 or 23 formed.

The strip 61 is cut to the required length from a continuous extrusion of a suitable resistant and hardwearing plastics material such as a high density polyolefine. The construction according to the invention is advantageous as the interconnectability which it affords allows filters of large surface areas to be installed easily from small lightweight units. For example, a typical compact filter element of size 1.5×1.5 m is too heavy to be installed by a single person and can be very awkward to install and/or remove, especially as the operators have to be careful not to damage the metal sides. With the instructions according to the invention however, smaller lightweight units of say 0.5×1.5 m can be slotted into place by a single operator and the resin frame sides remove concerns about deformation and make the installation quick and low in risk of damage.

It is of course to be understood that the invention is not intended to be restricted to the details of the above embodiments which are described by way of example only.

The invention claimed is:

1. A filter construction comprising a filter element comprising two pleated filter cloths mounted so that their folds are oppositely directed to form a series of lozenge-sectioned filtration chambers, the end edges of said cloths being clamped by edge strips, one located at each end of the filter, the edge strips being at least as wide as the pleats formed in the filter cloths, the edge strips each being formed as mouldings in the form of generally tubular members which provide rigid side elements, each tubular member having a longitudinal slot in one wall thereof into which the end edge regions of the filter cloth are inserted, and retained by clamping means which press parts of the end regions of the filter cloths against the inner face of said slotted wall to either side of said slot, the clamping means having means bearing on the inner surface of a wall of the tubular member opposite to the slot.

2. A filter construction according to claim 1, wherein the clamping member comprises a u-sectioned strip.

3. A filter construction according to claim 1, wherein said pleated filter cloths are also secured at top and bottom to top and bottom frame members.

4. A filter construction according to claim 3, wherein the top and bottom edges of said pleated filter cloths are encapsulated into moulded top and bottom frame members.

5. A filter construction according to claim 4, further comprising: reinforcing members embedded within the edge strips along a longitudinal axis.

6. A filter construction according to claim 5, wherein the reinforcing members comprise rods or profiles made from fibers, glass, carbon, fibers, braid or other textiles of glass, carbon or synthetic material.

7. A filter construction according to claim 1, wherein the edge strips each comprise a generally tubular member having a longitudinal slot in one wall thereof into which the end edges of the filter cloths are inserted, and retained by a clamping member.

8. A filter construction according to claim 7, wherein the clamping member is provided by an indented part of the opposed side wall which is disposed to press the edge regions of the filter cloths against the inner surface of the slotted side wall of the strip.

9. A filter construction according to claim 7, wherein the edge strip is of a generally elliptical cross-section.

10. A filter construction according to claim 8, wherein the edge strip is of a generally rectangular cross-section.

11. A filter construction according to claim 8, wherein the edge strip provides a curved slotted wall with flanges extending beyond a generally trapezoidal sectioned part.

12. A filter construction according to claim 9, wherein the edge strip is of a waisted oval shape, with opposed faces indented to define a two-lobed cross-sectional shape.

13. A filter construction according to claim 1, wherein the edge strips are made of polyurethane resin.

14. A filter construction according to claim 4, wherein edge strips are formed to be complementary so that a plurality of elements can be connected together side to side.

15. A filter construction according to claim 14, characterized in that one such edge strip is formed with two ribs which leave a channel therebetween, and a complementary edge strip is formed with a single rib which is dimensioned and shaped so as to fit into the channel.

16. A filter construction according to claim 15, wherein similar interconnectable parts are provided on the top and bottom frame members.

17. A filter construction according to claim 1, further comprising:
reinforcing members embedded within the edge strips along a longitudinal axis; and
reinforcing members embedded within the top and bottom frame members.

18. A filter construction according to claim 5, wherein the frame members are at least as wide as the pleats formed in the filter clothes.

19. A filter construction, comprising:
a filter element comprising two pleated filter cloths mounted so that their folds are oppositely directed to form a series of lozenge-sectioned filtration chambers;

end edges of said cloths being clamped by at least two edge strips, one edge strip located at each end of the filter, the edge strips being at least as wide as the pleats formed in the filter cloths, the edge strips each being formed as mouldings in the form of generally tubular members, each tubular member having a longitudinal slot in one wall thereof into which the end edge regions of the filter cloth are inserted, and retained by clamping means which press parts of the end regions of the filter cloths against the inner face of said slotted wall to either side of said slot, the clamping means having means bearing on the inner surface of a wall of the tubular member opposite to the slot;

reinforcing members embedded within the edge strips along a longitudinal axis; and top and bottom edges of said cloths are secured to top and bottom frame members, the frame members being at least as wide as the pleats formed in the filter cloths.

* * * * *